W. M. HOLLOWAY.
TALKING MACHINE.
APPLICATION FILED JULY 31, 1915.
1,349,759.
Patented Aug. 17, 1920.
3 SHEETS—SHEET 1.
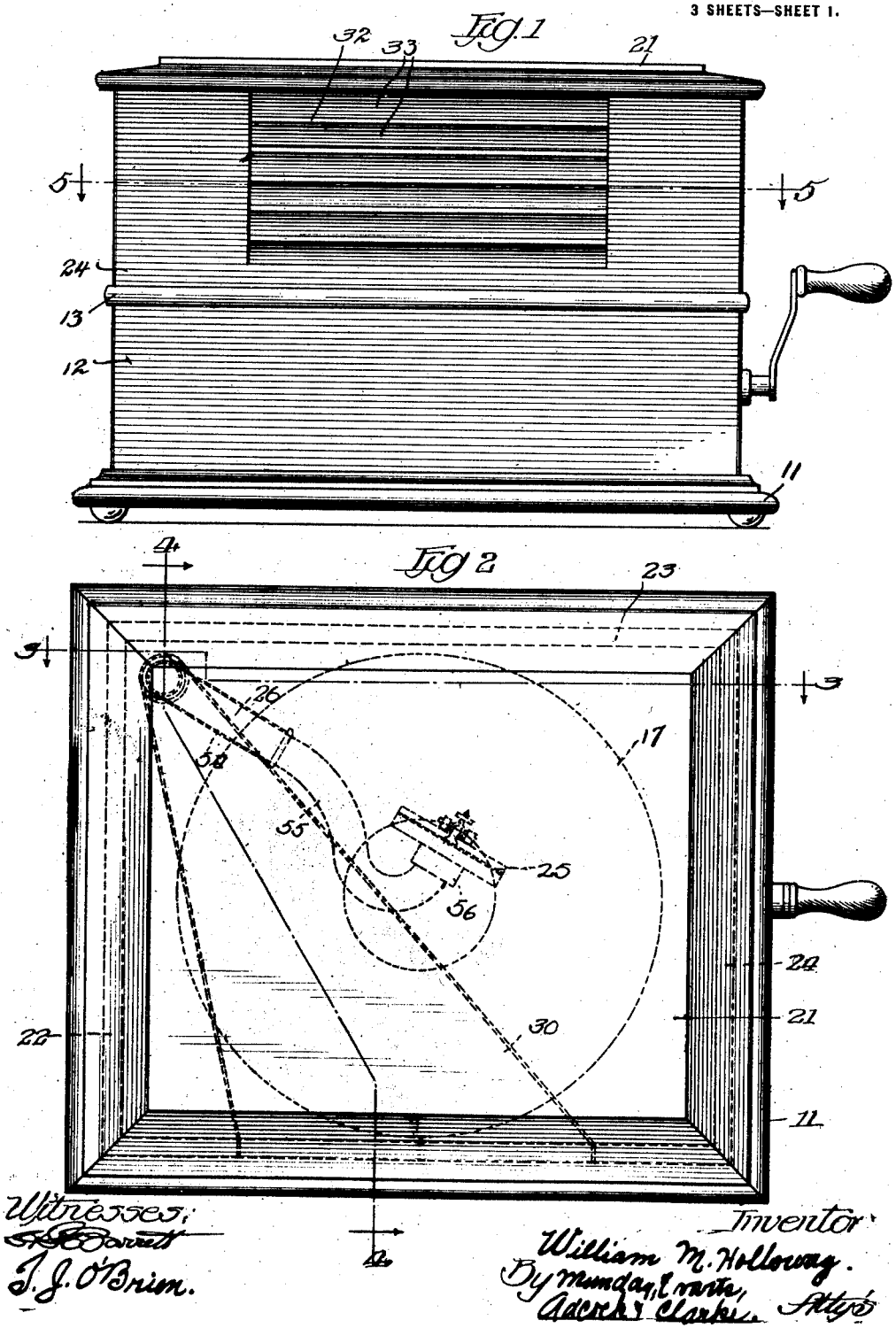

W. M. HOLLOWAY.
TALKING MACHINE.
APPLICATION FILED JULY 31, 1915.
1,349,759.
Patented Aug. 17, 1920.
3 SHEETS—SHEET 2.
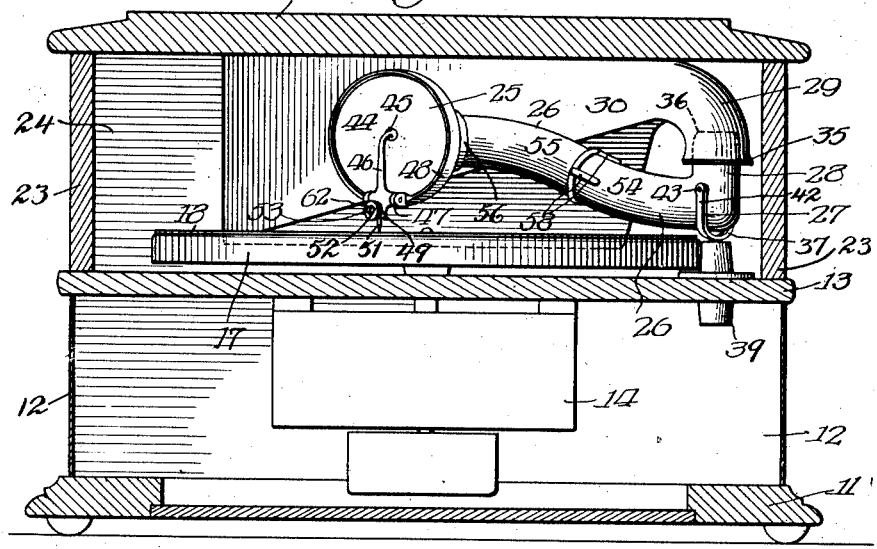
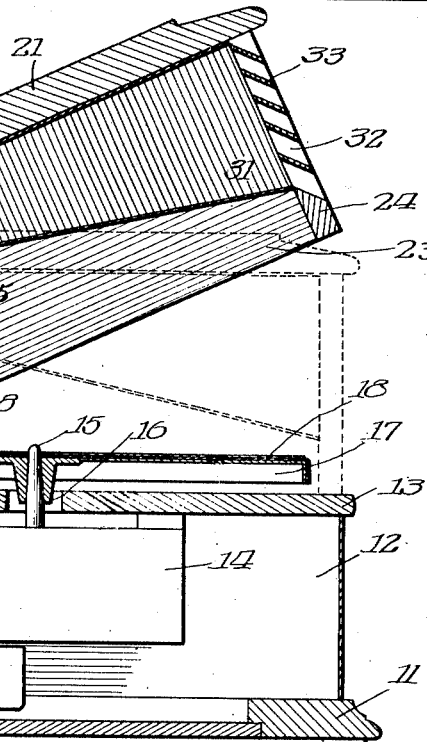
Witnesses:
S. E. Barrett
T. J. O'Brien.
Inventor
William M. Holloway.
By Munday, Evarts,
Adcock & Clarke, Attys

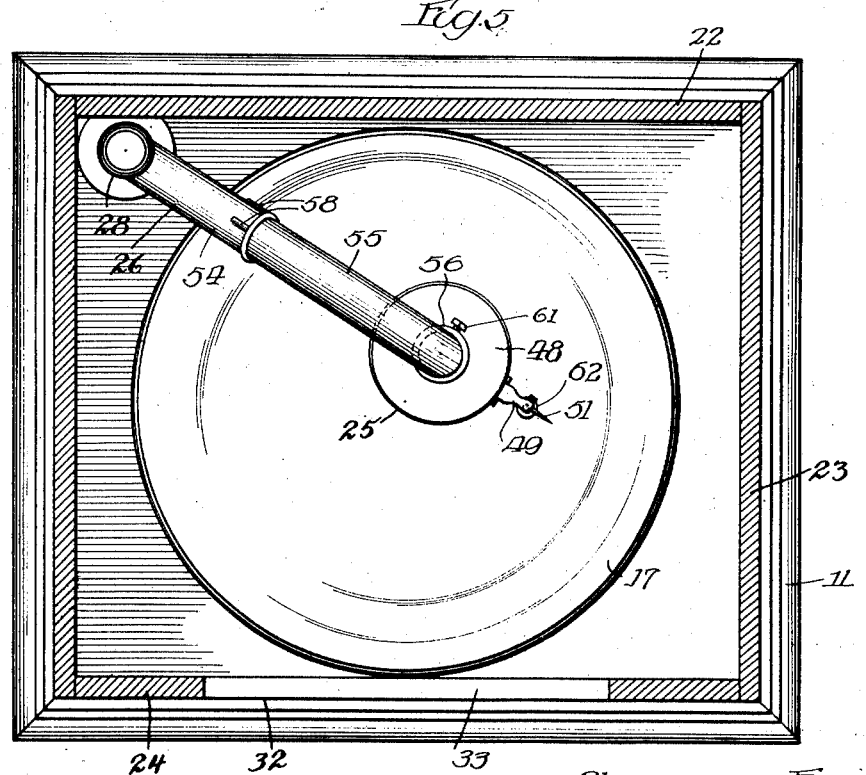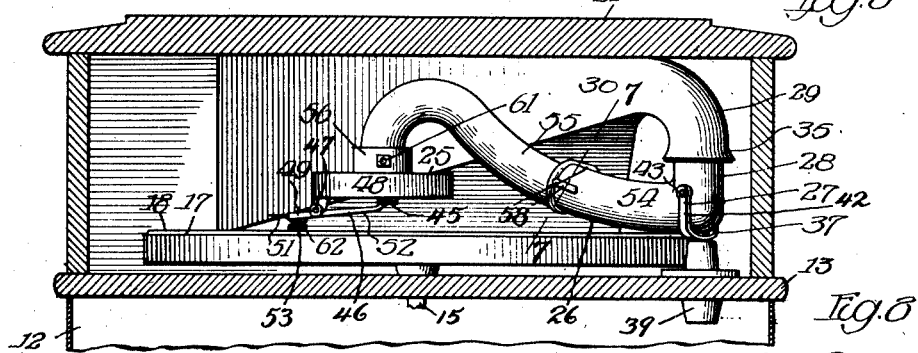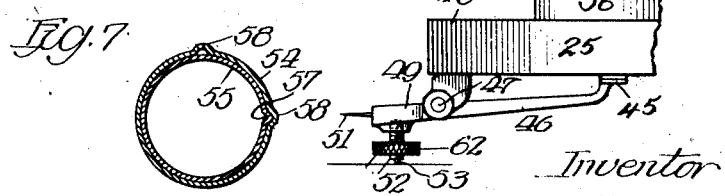

UNITED STATES PATENT OFFICE.

WILLIAM M. HOLLOWAY, OF MAYWOOD, ILLINOIS, ASSIGNOR TO AMERICAN CAN COMPANY, OF NEW YORK, N. Y., A CORPORATION OF NEW JERSEY.

TALKING-MACHINE.

1,349,759.　　　　　　Specification of Letters Patent.　　Patented Aug. 17, 1920.

Application filed July 31, 1915. Serial No. 42,972.

*To all whom it may concern:*

Be it known that I, WILLIAM M. HOLLOWAY, a citizen of the United States, residing in Maywood, in the county of Cook and State of Illinois, have invented a new and useful Improvement in Talking-Machines, of which the following is a specification.

This invention relates in general to talking machines and has for its object broadly the improvement in the construction and arrangement of the parts and their operation.

A principal object of the invention is the provision of a talking machine all parts of which with the exception of the handle for winding the same will be inclosed within the casing and the shortest possible route consistent with the production of sound of the desired volume will be provided to and through the amplifier.

A further object of the invention is the provision of a talking machine having an amplifier provided within the casing and this without requiring that the casing be made of materially greater depth to accommodate said amplifier.

A further object of the invention is the provision of a talking machine adapted for use with records having sound undulations in the side wall or walls of the record groove and also with records having sound undulations in the bottom of the record groove.

A further object of the invention is to provide a talking machine well adapted to produce sounds of desired quality and volume which will be cheap to manufacture, which will be relatively small and compact and which will present a pleasing appearance.

Numerous other and important objects and advantages will be apparent as the invention is better understood from the following description when considered in connection with the accompanying drawings disclosing a preferred embodiment thereof.

On the drawings,

Figure 1 is a front elevation of a talking machine embodying my invention;

Fig. 2 is a top plan view of the same;

Fig. 3 is a partial section on the line 3—3 of Fig. 2;

Fig. 4 is a section of the line 4—4 of Fig. 2 with the cover partly lifted;

Fig. 5 is a section on the line 5—5 with the amplifier removed;

Fig. 6 is a partial view similar to Fig. 3 and showing different adjustment of the parts;

Fig. 7 is a section taken on the line 7—7 of Fig. 6; and

Fig. 8 is an enlarged partial detail view of the stylus carrying arm and sound box.

Prior to my invention it has been generally the custom to provide an amplifier or a horn which extends downwardly from beneath the upper horizontal wall of the casing upon which is provided the control mechanism and above which extends the record support. This downwardly extending amplifier or horn has had connection at the front with the casing wall which is cut away in front of the horn to provide outlets for the amplified reproduced sound. Such an arrangement has required considerable space beneath the upper wall of the casing. These casings have been frequently provided with covers to be closed down while a record is playing and to exclude dust from the working parts. I have discovered that the height of the casing may be materially reduced and the height of the cover not correspondingly increased by locating the amplifier or horn within the cover and above the upper partition or top wall of the casing. The chamber provided between the top of the cover and the top wall of the casing must have a height to permit the sound box to stand in upright position and to accommodate the sound tube which conveys sound from the sound box to the amplifier. In accordance with my present invention the horn or amplifier is located within the cover itself and moves with it in its opening and closing movements, desired amplification being accomplished through the widening of the horn without increasing its depth an amount that would necessitate the provision of an unusually deep chamber above the upper partition or top wall of the casing proper.

Referring to the drawing it will be noted that 11 designates a suitable base and forms a bottom wall for the casing proper which is formed of the rectangular sheet metal side walls 12 and top wall 13, which may be certain purposes be considered a partition. This casing is provided to inclose the motor 14 of any usual or preferred construction. From it an upwardly extending stud 15 protrudes through an aperture 16 in the wall 13 and upon this stud is positioned the usual record support 17 adapted to carry a disk record. Operation of the motor turns the stud and record support and gives the desired rotation to the disk indicated at 18.

Extending upwardly from the rear wall of the casing is a wall 19, to the top of which is hinged a cover 21. The rear wall 22 of this cover is of width appropriate to cause the cover to close down nicely into closed position. As the side walls 23 and front wall 24 engage the upper face of the top wall 13 of the casing when the cover is closed, this means that the combined width of the walls 19 and 22 is equal to the width of each of the remaining walls. The cover is sufficiently deep to permit easy operation with plenty of clearance of a sound box 25, when the same is in the position shown in Figs. 2 and 3. This is the position it has when using a needle adapted for temporary use only and operating upon a record the sound impulse from which is derived from undulations in the side walls of the record groove.

The sound box in accordance with the usual custom is carried on the end of a sound tube or conductor 26 which, however, in accordance with my present invention is of new and improved construction. The sound tube is pivotally mounted at its other end at 27 and carries an upwardly extending open end 28 protruding into a down-turned end 29 of an amplifier 30.

The amplifier 30 in the present instance consists of a metal horn rectangular in cross section from its neck to its open end. The horn extends horizontally from adjacent the left-hand rear corner of the cover to the central part of the front wall, which, in front of the open end 31, is provided with ap opening 32 across which horizontally disposed inclined slats 33 are provided. The opening in the front extends from the top wall of the casing to very near its bottom and is widened horizontally to produce desired amplification of the sound. The neck 34 of the amplifier is curled outwardly at its bottom at 35 to permit it to close readily over the upwardly extending end 28 of the sound tube. The extremity 36 of the up-turned end 28 of the sound tube is made slightly smaller for the same purpose. When thus constructed the cover may be easily raised as desired, carrying with it the amplifier and not disturbing the arrangement of the sound tube. I have discovered by experiment that a break of continuity in the sound tube or amplifier where one part of the amplifier tube enters another part loosely has no material effect on the volume or quality of the sound.

The sound tube has two pivotal movements, one inwardly as the playing of the record proceeds and the other upwardly for placing it on and removing it from playing position. This pivotal movement is obtained by a yoke 37 having a stem 38 rotatably mounted in a socket member 39, an anti-friction device or ball 41 being positioned in the socket of said member beneath said stem. The two arms 42 of the yoke embrace the end of the sound tube and are pivotally connected to opposite sides at 43. Pivotal movement of the tube through movement of the yoke in the socket member 39 is produced as the needle follows the course of the record groove. Lifting of the tube is permitted through its connection with the yoke. As this can only occur when the cover is raised and the amplifier and sound tube disconnected, the amplifier offers no obstruction to the operation of the arm to bring it into and out of playing position.

A talking machine embodying my invention is adapted for use with records having record grooves which give impulse by sidewise movement of the stylus, and also with records having record grooves which give up and down movement to the stylus. The sound box 25 has the usual diaphragm 44, to which is fastened an end 45 of an arm 46 pivoted at 47 to the sound box casing 48. This arm has a socket part 49 in which a needle or stylus 51 may be positioned in line with the arm to adapt the apparatus for use with records which give impulse by moving the stylus or needle horizontally or sidewise, causing a movement of the arm about its pivot and consequent vibration of the diaphragm. It also has a socket 52 in which may be seated a stylus for use with records which cause movement through undulations in the bottom of the record groove. This socket in accordance with the usual custom carries a needle or stylus 53 formed from a precious stone, preferably a diamond, although any material of sufficient hardness may be used. The socket 52 is disposed at right angles to the length of the arm and when it carries a stylus in operation the sound box is moved from the vertical position shown in Fig. 3 to the horizontal position shown in Fig. 6. Up and down movement of the stylus when in this position causes a pivotal movement of the arm which gives the desired vibration to the diaphragm. In order that the sound box may be arranged to bring either needle or stylus into operative relation with a record, the sound tube 26 is made in two parts 54 and 55, the part 54 being integral with the up-turned end 28 and the part 55 having a pivotal connection in a collar 56 on the back of the sound box. The two parts 55 and 54 telescope at adjacent ends and have interlocking connection when arranged to bring either stylus into position. This connection consists of an outwardly stamped rib 57 in the inner telescoping end and a pair of recesses 58 formed by stamping out a similar rib in the outer end 54. The rib 57 in accordance with this construction forms a protuberance which may be seated in either recess to hold the sound box in desired relation, that is, vertical or horizontal, giving it different relations with respect to the axis of the tube. When it is desired to reproduce sounds from records giving impulse from undulations in the bottom of the record groove the sound box is disposed horizontally and with the arm 46 extending in the direction of the axis of the tube, being pivotally moved about its connection therewith from the position shown in Fig. 3, which is substantially the position when playing upon records giving impulse through undulations in the side walls of the record groove. If desired a thumb nut 61 may be employed to tighten down upon the end of the tube part 55 to hold it in either position. A thumb nut 62 is also provided to take into the socket member 49 to hold a needle or stylus adapted for temporary use only in place, and this thumb nut forms the socket member which receives the permanent stylus 53.

It is thought that the invention and many of its attendant advantages will be understood from the foregoing description, and it will be apparent that various changes may be made in the form, construction and arrangement of the parts without departing from the spirit and scope of the invention or sacrificing any of its material advantages, the form hereinbefore described being merely a preferred embodiment thereof.

I claim:

In a talking machine, the combination of mechanism and parts for reproducing sound, an amplifier, and a tube for conveying sound from said reproducing mechanism and parts to said amplifier, the communication between said tube and amplifier being open and loose without contacting parts, and pivotal supports for said tube and amplifier respectively whereby they have independent movements while the tonic connection is maintained.

In witness whereof I have hereunto set my hand in the presence of two subscribing witnesses.

WILLIAM M. HOLLOWAY.

Witnesses:
   CARL G. REININGER,
   JAMES MICHAEL.